Figure 1:
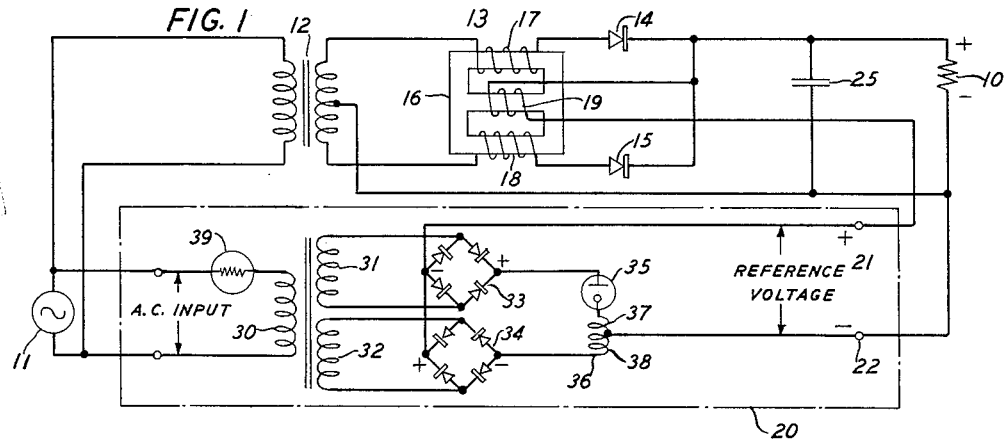

INVENTOR
W. H. BIXBY
BY
G. F. Heuerman
ATTORNEY

United States Patent Office 2,713,140
Patented July 12, 1955

2,713,140

REGULATED RECTIFYING APPARATUS

William H. Bixby, Detroit, Mich., assignor to Donald R. Middleton and Stanley M. Hanley, doing business as Power Equipment Company, a copartnership Application February 19, 1954, Serial No. 411,467

8 Claims. (Cl. 321—16)

This invention relates to current supply apparatus and particularly to apparatus for controlling the supply of rectified current from an alternating-current supply source to a load.

An object of the invention is to provide improved apparatus for controlling the supply of rectified current to a load to minimize load voltage changes.

Another object is to provide improved apparatus, energized by current from an alternating-current supply source, for setting up a substantially constant reference voltage.

In my copending application Serial No. 330,853, filed January 12, 1953, there is disclosed a circuit comprising a saturable reactor and a rectifier for supplying rectified alternating current to a load. For minimizing load voltage changes, there is impressed upon a saturating winding of the saturable reactor a voltage equal to the difference of the load voltage and a source of reference voltage derived from the alternating-current supply source. The circuit for deriving the reference voltage comprises a cold cathode, gas-filled, constant voltage tube and a source of rectified alternating current for energizing the circuit. When the load voltage is less than the voltage across the constant voltage tube, the reference voltage has as components the substantially steady voltage across the constant voltage tube and, in opposition thereto, a rectified alternating voltage. The reference voltage obtained in this way is not a steady direct voltage but has the form of a steady direct voltage with a superimposed full-wave rectified sine wave component known as a ripple component. This ripple component of the reference voltage is of little consequence in many control circuits using a saturable reactor since the ripple voltage component can be absorbed across the saturating or control winding of the reactor with very little flux change required in the core of the reactor. In some cases, however, it is desirable to have a saturating winding with a relatively small number of turns so as to improve the time constant of the regulating circuit. When the saturating winding has a small number of turns, it is desirable to have a source of reference voltage which is free of any significant ripple component.

In a specific embodiment of the present invention, herein shown and described for the purpose of illustration, there is provided a cold cathode, gas-filled constant voltage device and the winding of an inductance device having a core of magnetic material in a series circuit upon which is impressed a voltage equal to the sum of the output voltages of a first and a second full wave rectifier. The reference voltage is derived across a current path which comprises in series the output voltage of the first rectifier, the constant voltage device and a portion only of the inductance winding. The ripple voltage component across this portion of the inductance winding is made substantially equal in amplitude and opposite in phase to the ripple voltage component of the first rectifier in order to reduce the ripple voltage across the current path substantially to zero. To accomplish this, the ratio of the turns of the inductance device in the current path to the turns in the circuit which includes the sum of the rectifier voltages is made equal to the ratio of the first rectifier output voltage to the sum of the output voltages of the first and second rectifiers.

Adjustability of the rectifier output voltages can be achieved by any of the arrangements shown and described in my prior application referred to above. In these arrangements a potentiometer having a rectified voltage impressed across it is employed for raising or lowering the reference voltage. To eliminate the ripple component from the reference voltage, the circuit should be designed so that the ripple voltage across a portion of the inductance winding substantially prevents the flow of a ripple current component through the potentiometer. In a specific embodiment of the invention employing such an arrangement for adjusting the reference voltage, there is provided an inductance device having a first, a second and a third winding portion. The circuit for supplying current to the winding portions comprises in series, in the order named, starting with the positive output terminal of a first bridge rectifier, the first winding portion, a constant voltage device, to the negative terminal of a second bridge rectifier, and from the positive terminal of the second rectifier through the third and second winding portions to the negative terminal of the first rectifier. The winding portions are wound on the core in a direction such that the winding portions respectively set up aiding magnetomotive forces in the core. Alternating current is supplied to the first bridge rectifier through a transformer the secondary of which has a mid-terminal, a potentiometer being provided in a current path connecting the mid-terminal and the common terminal of the second and third winding portions. The reference standard voltage is taken from across a current path comprising in series an adjustable portion of the potentiometer, the second winding portion, the output terminals of the first bridge rectifier, the first winding portion and the constant voltage device. In order to eliminate the ripple component from the reference standard voltage, the turns of the first and second winding portions are made equal and the ratio of the turns of the first winding portion to the turns of the third winding portion is made equal to the ratio of one-half the output voltage of the first bridge rectifier to the output voltage of the second bridge rectifier.

In a third illustrative embodiment of the invention herein shown and described, alternating current is supplied to each of a first and a second full-wave rectifying means from a single transformer winding having a plurality of terminals. A first of the rectifying means supplies current to a circuit which may be traced from the positive rectifier terminal, through a constant voltage device and through a first and a second winding portion of an inductance device to the negative rectifier terminal. The second rectifying means supplies current from the positive rectifier terminal through a potentiometer and a third portion of the inductance device in series. The reference standard voltage is obtained from leads connected respectively to a common terminal of the first and second winding portions and to the variable tap of the potentiometer. The ripple component is eliminated from the reference voltage by (1) making the ratio of the turns of the third winding portion to the sum of the turns of the first and second winding portions equal to the ratio of the output voltage of the second rectifying means to the output voltage of the first rectifying means and (2) making the ratio of the turns of the first winding portion to the turns of the second winding portion equal to the ratio of the voltage between the positive terminal of the first rectifier and the positive terminal of the second rectifier to the voltage between the positive terminal of the second rectifier and the negative terminal of the first rectifier.

Figure 2:
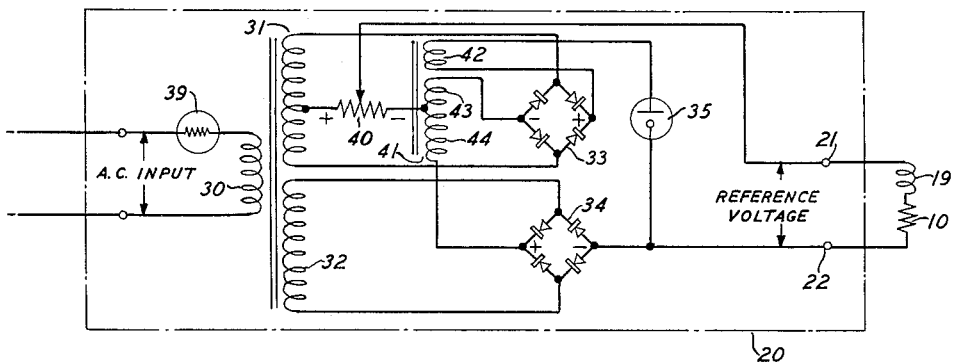
Figure 3:
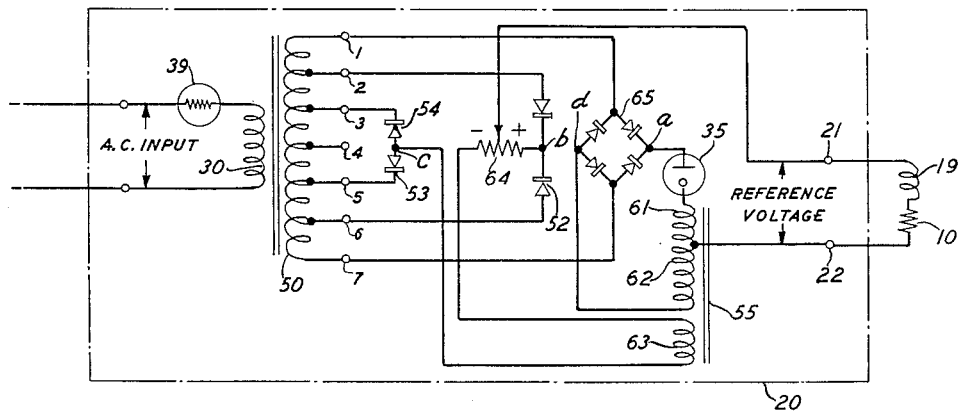

The invention will now be described in greater detail with reference to the accompanying drawing in which:

Fig. 1 is a schematic view of a current supply apparatus embodying the invention; and Figs. 2 and 3 are schematic views of modifications of a portion of the current supply apparatus shown in Fig. 1.

Referring to Fig. 1 of the drawing, full-wave rectified current is supplied to a load 10 from an alternating-current supply source 11 through a circuit comprising a transformer 12, a saturable reactor 13 and rectifying elements 14 and 15. A filtering condenser 25 is connected across the load. A midterminal of the secondary of transformer 12 is connected to the negative terminal of the load. The saturable reactor 13 comprises a three-legged core 16 of magnetic material, impedance windings 17 and 18 on the outer legs respectively of the core, and a saturating winding 19 of a relatively few turns on the middle leg. One of the end terminals of the secondary transformer winding is connected through the impedance winding 17 of the saturable reactor and through rectifier element 14 to the positive load terminal and the other end terminal of the secondary transformer winding is connected through the impedance winding 18 and the rectifier element 15 to the positive load terminal.

Apparatus within the dash-dot enclosure 20 provides across terminals 21, 22 a unidirectional, substantially constant reference standard voltage. This standard voltage may be substantially equal to a predetermined desired voltage across the load 10. A voltage equal to the difference of the load voltage and the reference standard voltage is impressed across the saturating winding 19 of the saturable reactor. Then, when the load voltage increases, for instance, current flows through the winding 19 in a certain direction such as to cause to be set up in each of the outer legs of the core 16 a magnetomotive force which opposes the magnetomotive forces set up by the currents flowing through the windings 17 and 18, respectively. The impedance of each of windings 17 and 18 is thus increased with the result that the load current is decreased to minimize the assumed rise of load voltage. If the load voltage decreases below the predetermined voltage, current is caused to flow in the opposite direction through the saturating winding 19 to thereby set up a magnetomotive force which aids the magnetomotive forces set up by the windings 17 and 18, respectively. The impedance of windings 17 and 18 thus decreases to cause the decrease of load voltage to be minimized.

The turns of the saturating winding 19 are preferably small so that the time constant of the regulating circuit is relatively small. The source of reference voltage 20 is therefore preferably designed so that it has substantially no alternating or ripple voltage component which, if present, would cause an undesired ripple component current to flow through said source. For generating the reference voltage there is provided a circuit arrangement comprising a transformer having a primary winding 30 and two secondary windings 31 and 32, two full wave rectifiers 33 and 34, a gas-filled, cold cathode, constant voltage device 35 and an inductance device 36 comprising a core of magnetic material and a winding thereon having two winding portions 37 and 38. Current is supplied to primary transformer winding 30 from the alternating-current supply source 11 through a ballast lamp 39 for maintaining the alternating current supplied to winding 30 substantially constant. Secondary transformer windings 31 and 32 are connected to the input terminals, respectively, of bridge rectifiers 33 and 34. There is provided a circuit which may be traced from the positive output terminal of rectifier 33 to the anode of the constant voltage tube 35, from the cathode of the tube through the winding 37, 38 of the inductance device 36 to the negative terminal of rectifier 34 and from the positive terminal of rectifier 34 to the negative terminal of rectifier 33. A pulsating unidirectional current thus flows in the circuit to cause to be set up across the tube 35 a substantially constant unidirectional voltage which is larger than the voltage across the load 10. The reference voltage at terminals 21 and 22 is the voltage across the current path comprising the output of rectifier 33, the constant voltage tube 35 and the winding portion 37 of the inductance device 36. Since the output voltage of rectifier 33 is opposed to the voltage across tube 35 in this current path, the reference voltage is less than the voltage across the constant voltage device 35 and may be substantially equal to the voltage across the load 10. The ratio of the turns of winding portion 37 to the turns of both winding portions 37 and 38 is chosen to be substantially equal to the ratio of the output voltage of rectifier 33 to the sum of the output voltages of rectifiers 33 and 34. Under this condition, the alternating or ripple voltage component across the winding portion 37 is equal and opposite to the ripple voltage component across the output terminals of rectifier 33 in the current path connected across terminals 21 and 22. The alternating or ripple component of the reference voltage is thus reduced to zero or a negligibly small amplitude. The output voltage of rectifier 33 may be one-half the output voltage of rectifier 34, for example, and in that case the winding portion 37 will have half as many turns as the winding portion 38.

Fig. 2 shows a modification of the reference voltage generator 20 of Fig. 1, corresponding parts being designated by the same numerals in both figures. In Fig. 2 there are provided a potentiometer 40 and an inductance device 41 having three winding portions 42, 43 and 44. There is provided a circuit which may be traced from the positive output terminal of rectifier 33, through winding portion 42 of inductance device 41, through the constant voltage device 35 to the negative output terminal of rectifier 34, and from the positive output terminal of rectifier 34 through winding portions 44 and 43 in order, to the negative terminal of rectifier 33. One end terminal of potentiometer 40 is connected to a mid-terminal of transformer winding 31 and the other end terminal of the potentiometer is connected to a common terminal of winding portions 43 and 44. The variable tap of potentiometer 40 is connected to terminal 21 and the cathode of constant voltage tube 35 is connected to terminal 22. The reference voltage is therefore the voltage across the current path which comprises an adjustable portion of potentiometer 40, winding portion 43 of inductance device 41, the output of rectifier 33, winding portion 42 and the constant voltage device 35.

The winding portions 42, 43 and 44 are wound so that currents supplied to these winding portions set up aiding magnetomotive forces in the core. A full wave rectified voltage equal to substantially one-half the output voltage of bridge rectifier 33 is set up between the mid-terminal of transformer winding 31 and the negative terminal of bridge rectifier 33. There is set up across the winding portion 43 an alternating or ripple voltage component which is equal and opposite in phase to the ripple voltage component between the mid-terminal of transformer winding 31 and the negative terminal of rectifier 33. Therefore, the voltage across potentiometer 40 has substantially zero ripple component. The sum of the alternating or ripple voltage components across winding portions 42 and 43 is substantially equal to the ripple component of the output voltage of rectifier 33. The reference voltage across terminals 21 and 22 therefore has substantially zero ripple component. These results are accomplished by making the turns of winding portions 42 and 43 substantially equal and by making the ratio of the turns of winding portion 42 to the turns of winding portion 44 equal to the ratio of one-half the output voltage of bridge rectifier 33 to the output voltage of bridge rectifier 34.

In Fig. 3, the transformer having a primary winding 30 has a single secondary winding 50 having terminals 1 to 7, inclusive. Terminal 4 is a mid-terminal. The turns of the secondary winding between the mid-terminal and terminals 1, 2 and 3, respectively, are equal to the turns between the mid-terminal and terminals 7, 6 and 5, respectively. There is provided a rectifier comprising rectifying elements 51, 52, 53 and 54 for providing a full wave rectified output voltage between a positive terminal $b$ and a negative terminal $c$. There is provided an inductance device having winding portions 61, 62 and 63. There is connected between the rectifier terminals $b$ and $c$ a potentiometer 64 and in series therewith the winding portion 63. During one half cycle period of the alternating voltage across transformer winding 50, current flows from terminal 2, through rectifying element 51, potentiometer 64, winding portion 63 and rectifying element 53 to terminal 5. During a succeeding half-cycle period, current flows from terminal 6, through rectifying element 52, potentiometer 64, winding portion 63 and rectifying element 54 to terminal 3. There is provided a bridge rectifier 65 having input terminals connected to the terminals 1 and 7 of transformer winding 50, a positive output terminal $a$ and a negative output terminal $d$. Full wave rectified current is supplied by rectifier 65 to a current path comprising constant voltage device 35 and winding portions 61 and 62, all in series. The reference voltage across terminals 21 and 22 is the potential difference between the variable tap of potentiometer 64 and the common terminal of winding portions 61 and 62. The winding portions 61, 62 and 63 are wound in a direction such that the currents in the winding portions, respectively, cause aiding magnetomotive forces to be set up in the core of the inductance device 55.

The alternating or ripple voltage across winding portion 63 is made equal and opposed to the ripple component of the voltage between rectifier terminals $b$ and $c$ so that substantially no ripple current component flows through the potentiometer 64. The alternating or ripple voltage across winding portion 61 is made equal and opposed to the ripple voltage component between the rectifier terminals $a$ and $b$. Therefore, there is substantially no ripple component in the reference voltage between terminals 21 and 22. These results are accomplished by (1) making the ratio of the turns of winding portion 61 to the turns of winding portion 62 equal to the ratio of the voltage from terminal $a$ to terminal $b$ to the voltage from terminal $b$ to terminal $d$, and (2) making the ratio of the turns of winding portion 63 to the sum of the turns of winding portions 61 and 62 equal to the ratio of the voltage from terminal $b$ to terminal $c$ to the voltage from terminal $a$ to terminal $d$.

What is claimed is:

1. In combination, a constant voltage device having the characteristic that the voltage across said device remains substantially constant irrespective of changes of current flowing through said device over an operating current range, an inductance device having a core of magnetic material and winding means of a plurality of turns to which current may be supplied for setting up a flux in said core, means for impressing a first pulsating unidirectional voltage across a first current path comprising in series said constant voltage device and a portion at least of said winding means, and means for deriving an output voltage across a second current path comprising in series a portion of said winding means, said constant voltage device and a source of pulsating unidirectional voltage having a wave form similar to that of said first pulsating unidirectional voltage, the ratio of the turns of said winding means in said second current path to the turns of the winding means in said first current path being substantially equal to the ratio of the pulsating unidirectional voltage in said second current path to said first pulsating unidirectional voltage.

2. In combination, a constant voltage device having the characteristic that the voltage across said device remains substantially constant irrespective of changes of current flowing through said device over an operating current range, an inductive device having a core of magnetic material and winding means to which current may be supplied for setting up a flux in said core, means for impressing a first pulsating unidirectional voltage across a first current path comprising in series said constant voltage device and a portion at least of said winding means, and means for deriving an output voltage across a second current path comprising in series a portion of said winding means having fewer turns than the turns of the winding means in said first current path, said constant voltage device, and a source of pulsating unidirectional voltage having a wave form similar to that of said first pulsating unidirectional voltage and an amplitude less than the amplitude of said first pulsating unidirectional voltage.

3. A combination in accordance with claim 2 in which the ratio of the turns of said winding means in said second current path to the turns of said winding means in said first current path is substantially equal to the ratio of the pulsating unidirectional voltage in said second current path to said first pulsating unidirectional voltage.

4. In combination, a first full wave rectifier for deriving from an alternating-current source a first pulsating unidirectional output voltage, a second full wave rectifier for deriving from said alternating-current source a second pulsating unidirectional output voltage, a cold cathode, gas-filled constant voltage device, an autotransformer having a core and a winding of a plurality of turns thereon, a first circuit comprising in series said winding, said constant voltage device and said first and second pulsating unidirectional output voltages in aiding relationship, and a second circuit comprising in series said first pulsating unidirectional output voltage, said constant voltage device, and a portion only of the turns of said winding, the ratio of the turns of said winding in said second circuit to the turns in said first circuit being substantially equal to the ratio of said first pulsating unidirectional output voltage to the sum of said first and second pulsating unidirectional output voltages.

5. A combination in accordance with claim 4 in which there are provided a transformer having primary and secondary windings for supplying alternating current from said source to said rectifiers and means for minimizing changes of the alternating current supplied from said source to said primary.

6. Means for setting up a substantially steady reference voltage comprising a first and a second bridge rectifier each having a pair of input terminals and negative and positive output terminals, means comprising a transformer for supplying alternating currents to said bridge rectifiers, said transformer having a first winding connected to the input terminals of said first rectifier and a second winding connected to the input terminals of said second rectifier, a constant voltage device having the characteristic that the voltage across said device remains substantially constant irrespective of changes of current flowing through said device over an operating current range, an inductance device having a core and winding means having a plurality of turns to which current may be supplied for setting up flux in said core, said winding means having a first, a second and a third winding portion, a potentiometer having a variable tap, a first current path comprising said potentiometer and said second winding portion in series connecting a mid-terminal of said first transformer winding to the negative output terminal of said first rectifier, a second current path comprising said first winding portion and said constant voltage device in series connecting the positive terminal of said first rectifier to the negative terminal of said second rectifier, a third current path comprising said third and second winding portions in series connecting the positive terminal of said second rectifier to the negative terminal of said first rectifier, the currents supplied through said first, second and third winding portions setting up aiding magnetomotive forces in said core, said reference voltage being set up between the variable tap of said potentiometer and the common terminal which is the negative output terminal of said second rectifier and a terminal of said constant voltage device, the turns of said first and second winding portions being equal and the ratio of the turns of said first winding portion to the turns of said third winding portion being equal to the ratio of one-half the voltage of said first rectifier to the voltage of said second rectifier.

7. Means for setting up a substantially constant reference voltage in accordance with claim 6 in which said transformer has a primary winding to which is supplied current from an alternating-current source and in which there is provided in series with said primary winding means for minimizing amplitude changes of the alternating current supplied to said primary winding.

8. Means for setting up a substantially constant reference voltage across a pair of conductors comprising a transformer having a primary to which current is supplied from an alternating-current supply source and a secondary winding, a first and a second full wave rectifier each having a positive and a negative output terminal, each of said rectifiers being energized from said secondary transformer winding, an inductance device comprising a core and winding means having a plurality of turns to which current may be supplied for setting up flux in said core, said winding means having a first, a second and a third winding portion, a constant voltage device having the characteristic that the voltage across said device remains substantially constant irrespective of changes of current flowing through said device over an operating current range, a current path across said positive and negative terminals of said first rectifier comprising in series said constant voltage device and said first and second winding portions, a potentiometer having a variable tap, a current path across said positive and negative terminals of said second rectifier comprising in series said potentiometer and said third winding portion, the currents supplied through said first, second and third winding portions setting up aiding magnetomotive forces in said core, said conductors across which said reference voltage is set up being connected respectively to the variable tap of said potentiometer and to a common terminal of said first and second winding portions, the ratio of the turns of said first winding portion to the turns of said second winding portion being equal to the ratio of the voltage between the positive terminal of said first rectifier and the positive terminal of said second rectifier to the voltage between the positive terminal of the second rectifier and the negative terminal of said first rectifier, the ratio of the turns of said third winding portion to the sum of the turns of said first and second winding portions being equal to the ratio of the output voltage of said second rectifier to the output voltage of said first rectifier.

No references cited.